Dec. 4, 1934.  E. H. ELLISON  1,983,125
ADJUSTABLE HINGE
Filed Dec. 10, 1929  6 Sheets-Sheet 1

Inventor
EDWARD H. ELLISON
By his Attorneys
Bohleber + Ledbetter

Dec. 4, 1934.  E. H. ELLISON  1,983,125
ADJUSTABLE HINGE
Filed Dec. 10, 1929  6 Sheets-Sheet 2
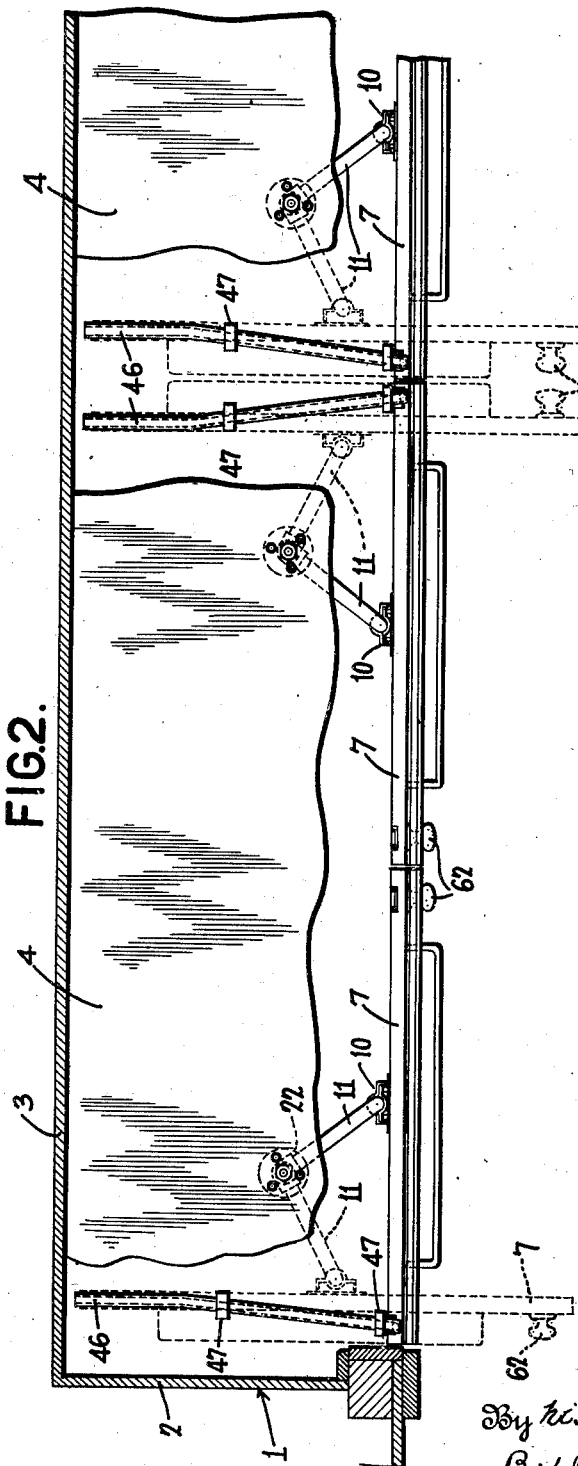
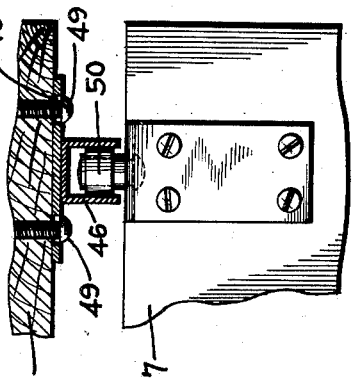
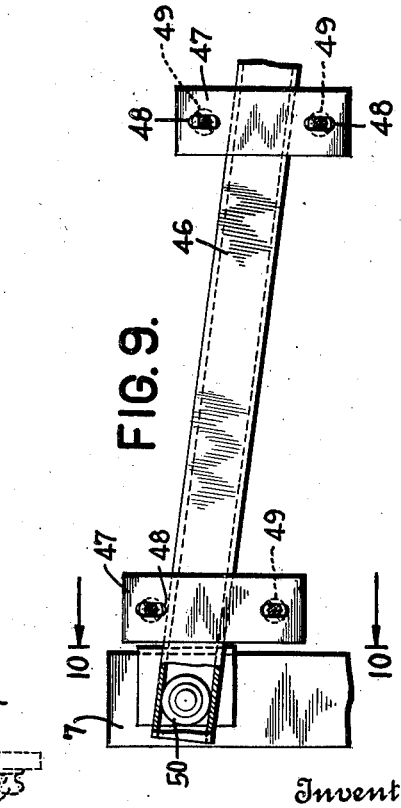
Inventor
EDWARD H. ELLISON
By his Attorneys
Bohleber + Ledbetter Dec. 4, 1934.  E. H. ELLISON  1,983,125
ADJUSTABLE HINGE
Filed Dec. 10, 1929  6 Sheets-Sheet 3
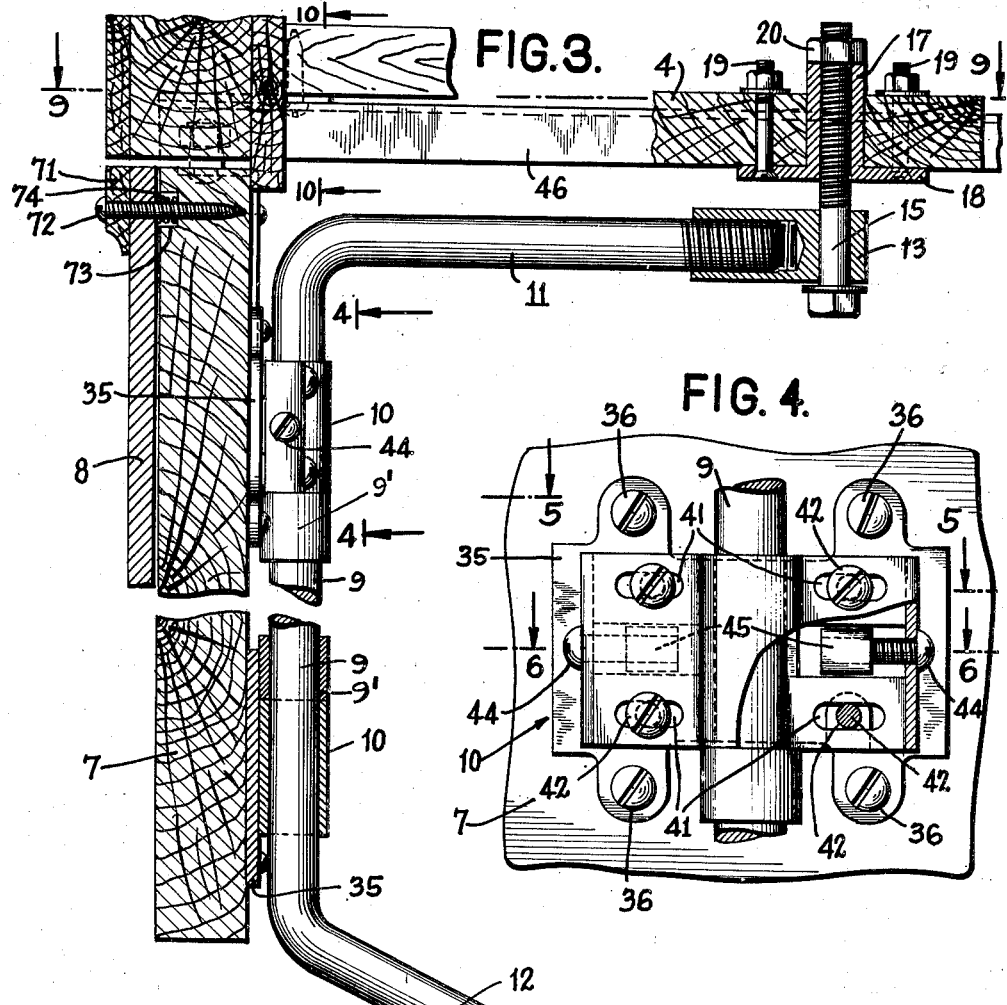
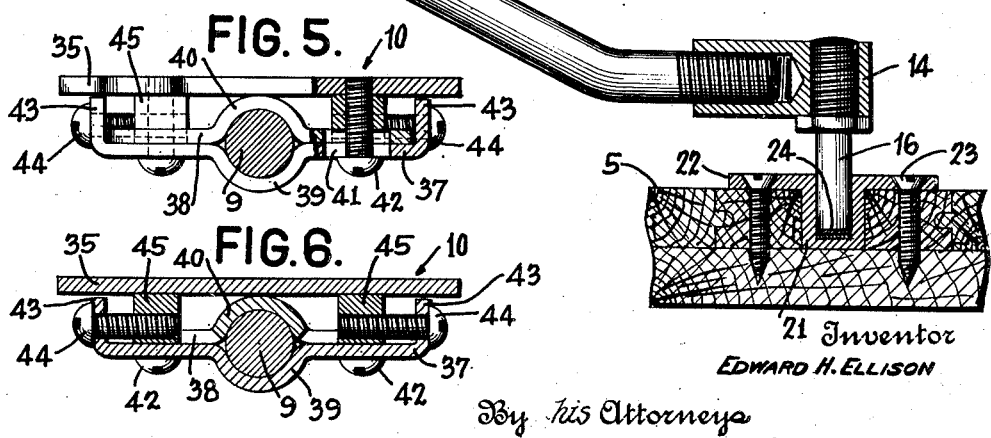
Inventor
EDWARD H. ELLISON
By his Attorneys
Bohleber & Ledbetter Dec. 4, 1934.   E. H. ELLISON   1,983,125
ADJUSTABLE HINGE
Filed Dec. 10, 1929   6 Sheets-Sheet 4

Inventor
EDWARD H. ELLISON
By his Attorneys
Bohleber + Ledbetter

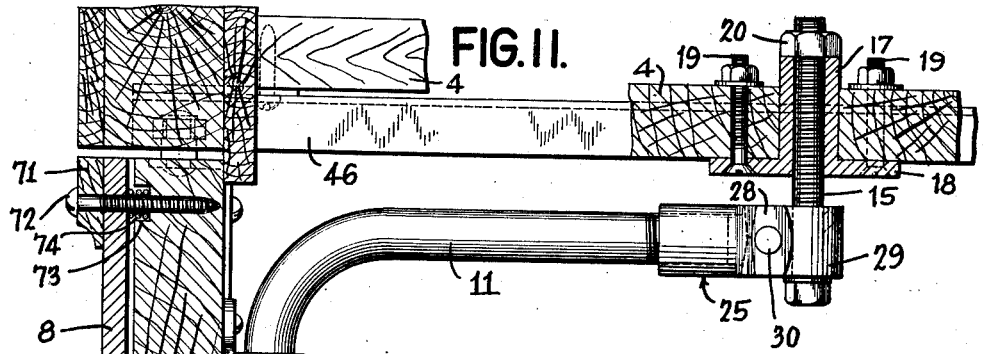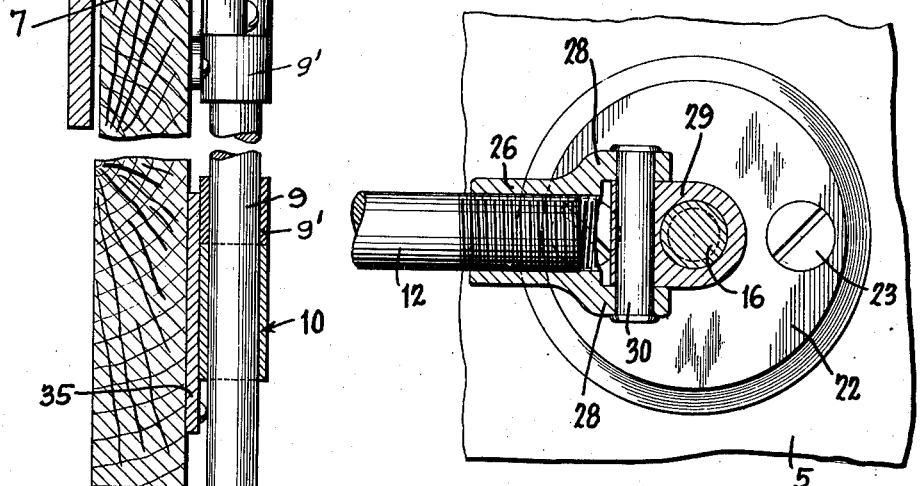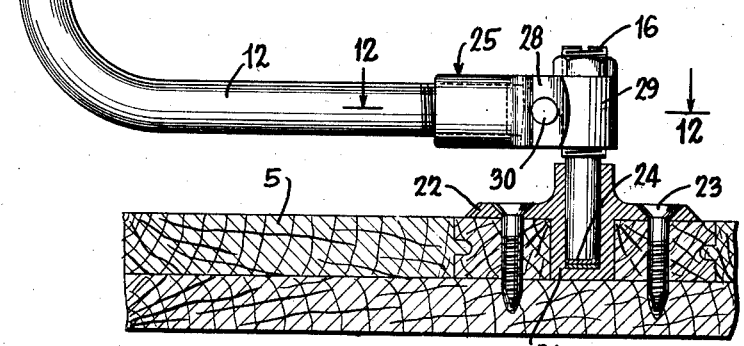

Dec. 4, 1934.  E. H. ELLISON  1,983,125
ADJUSTABLE HINGE
Filed Dec. 10, 1929  6 Sheets-Sheet 6
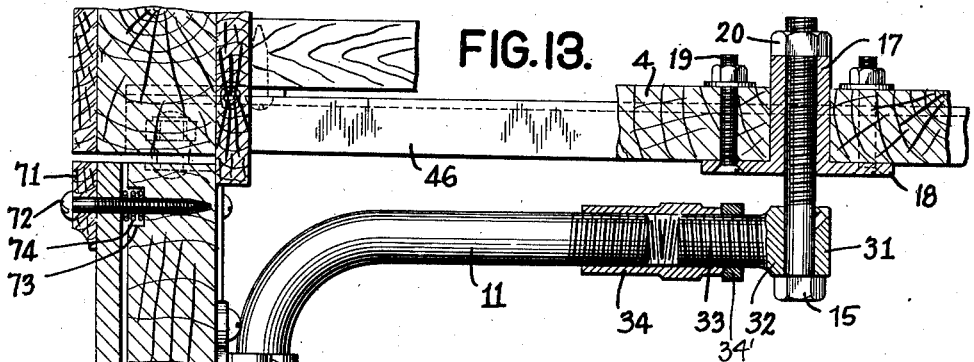
FIG.13.
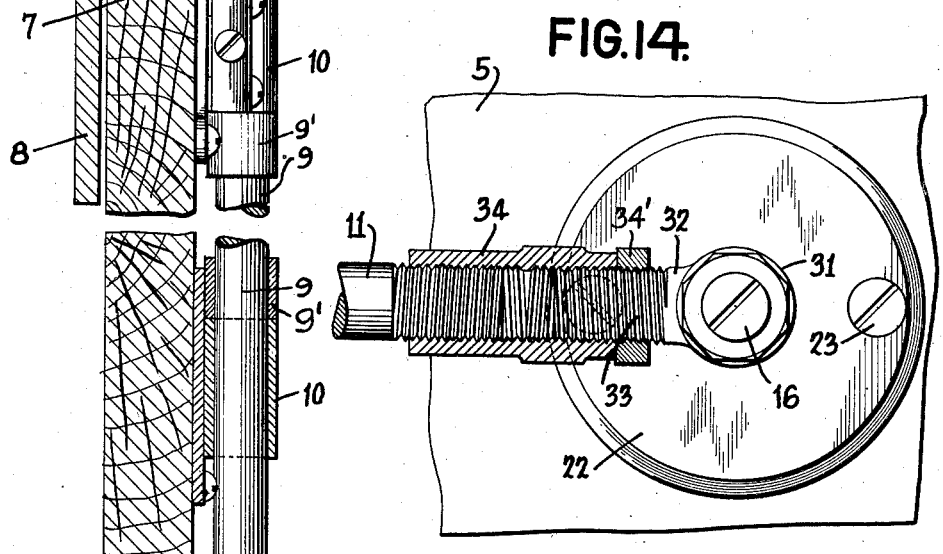
FIG.14.
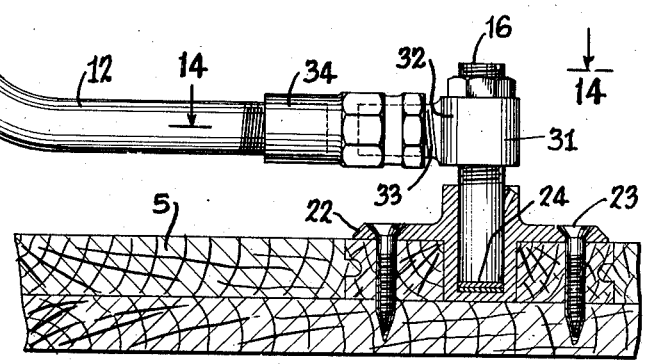
Inventor
EDWARD H. ELLISON
By his Attorneys
Bohleber + Ledbetter Patented Dec. 4, 1934

1,983,125

UNITED STATES PATENT OFFICE 1,983,125

ADJUSTABLE HINGE

Edward H. Ellison, Jamestown, N. Y., assignor, by mesne assignments, to Austral Window Company, New York, N. Y., a corporation of Maine Application December 10, 1929, Serial No. 412,981

9 Claims. (Cl. 16—129)

This invention relates to wardrobes and more particularly to that type of wardrobes which are usually a permanent part of a building, such as a schoolroom, and arranged to shut off a small portion of the room, as an end, for wardrobe purposes, but adapted to be opened and give ready access thereinto by a number of persons at one time.

The objects of the invention are to provide a structure of this type which will properly support large and heavy doors such as are required in a schoolroom, to enable the doors to be utilized, when closed, as a blackboard for the schoolroom, or a false wall for that portion of the schoolroom; to provide a structure wherein the meeting edges of the closed doors will be absolutely flush and very close so that the same may constitute a continuous blackboard and so that chalk and erasers will slide perfectly from one door to the other when so used; to provide rigid and permanent adjustments for hanging the doors with the utmost precision; to provide for universal or adjustment in three directions at the hinging of the doors; to make such adjustment accessible and readily manipulated by simple tools; to avoid use of tracks for the door on the floor; to minimize the floor attaching portions and make the same of a character which will interfere as little as possible with sweeping or other cleaning operations; to provide a structure which will retain its adjustment and proper alignment under the most severe tests of use and misuse to which schoolroom apparatus may be subjected; to provide a lower pivot for the door which will carry the weight and operate without excessive wear; and to secure simplicity of construction, installation and operation.

These and other objects of the invention and the means for their attainment will be more apparent from the following detailed description taken in connection with the accompanying drawings illustrating one embodiment by which the invention may be realized and in which:—

Figure 2 is a sectional plan of the wardrobe taken at the upper edge of the doors;

Figure 3 is a vertical sectional view on line 3—3 of Figure 1;

Figure 4 is an elevation of an adjustable attaching bracket looking at the same in the direction of the arrow on line 4—4 of Figure 3;

Figure 7:
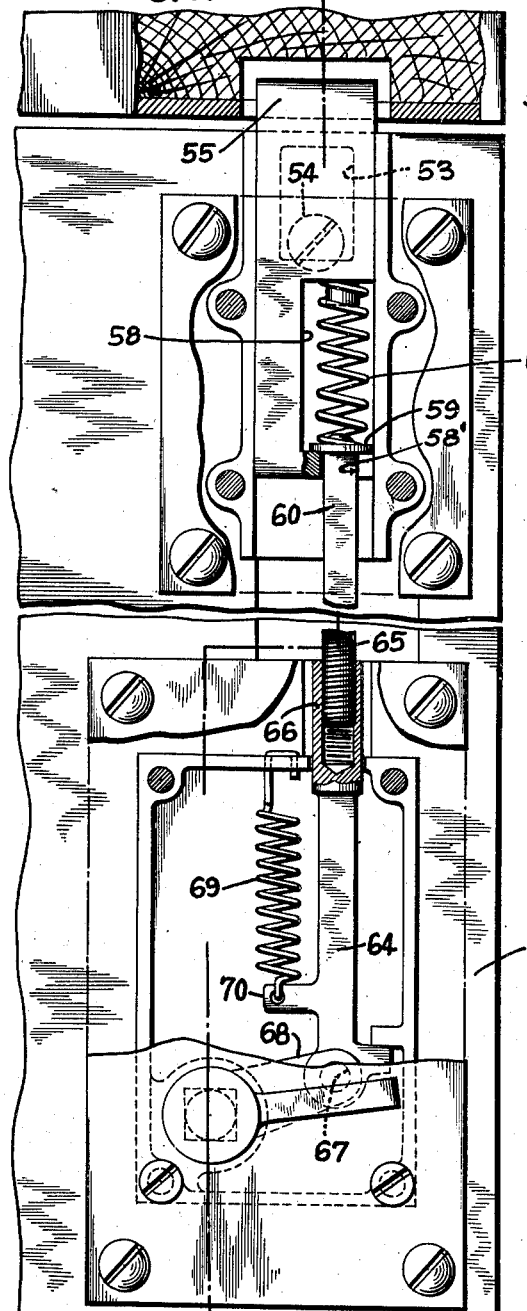
Figure 8:
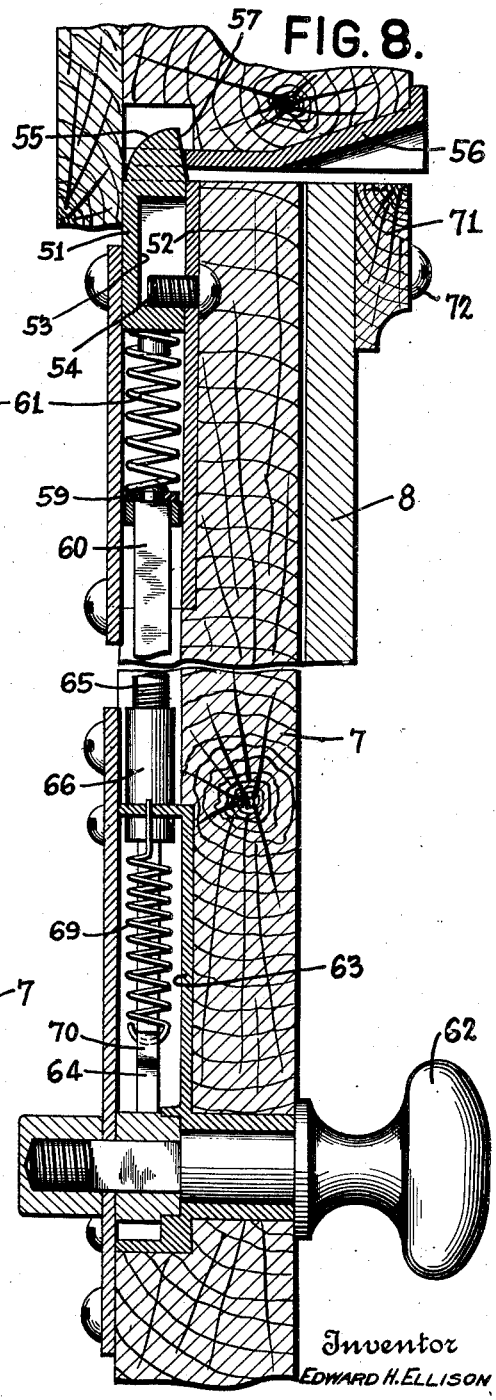

Figures 5 and 6 are sectional views of the bracket taken on lines 5—5 and 6—6 respectively of Figure 4;

Figure 7 is a front elevation of the catch construction for the meeting edges of the doors, with parts broken away for purposes of showing details of construction;

Figure 8 is a vertical sectional view of the catch construction on line 8—8 of Figure 7;

Figure 9 is a sectional view on line 9—9 of Figure 3;

Figure 10 is a sectional view on line 10—10 of Figure 3;

Figure 11 is a view similar to Figure 3 but showing a modified structure;

Figure 12 is a detail sectional view on the line 12—12 of Figure 11;

Figure 13 shows still another modification of the structure shown in Figure 3; and Figure 14 is a section on the line 14—14 of Figure 13.

In the specific embodiment of the invention illustrated in said drawings the reference numeral 1 indicates the wardrobe enclosure in general, the same being shown as having side walls 2, back wall 3, top wall 4 and floor 5, the wardrobe being open at its front except for the doors hereinafter described so as to provide a large opening or doorway bordered, if desired, by a suitable door jamb or molding 6. I have shown doors 7 for closing this front opening of the wardrobe, the doors preferably being arranged in pairs such that each pair cooperate to close a section of the wardrobe. The fronts of the doors conveniently have slates 8 mounted thereon, these slates usually being referred to as blackboards. It is a feature of the present invention to mount the doors in such manner that slates or blackboards 8 on adjoining doors 7 will be flush with each other when the doors 7 are closed. Ordinarily with doors of the size, height and weight required for use in schoolrooms, which obviously have high ceilings, it is a very difficult matter to hang the same with such precision that the meeting edges of blackboards will be flush with each other for enabling the blackboard to be used as a continuous surface so that the joints will not interfere with smooth passage of chalk or crayon thereover or set up interference to the use of an eraser across the joint. In order to obtain this perfect hanging of the doors, I provide the several parts next to be described.

I provide a vertical hinge rod 9 substantially the height of the door 7 and shown secured to the rear side of the door by similar adjustable upper and lower attaching brackets 10. Collars 9' are secured, as by welding or riveting, to the rod 9, one immediately under the upper hinge member 10, and one immediately over the lower hinge member. These collars prevent the door and hinges from sliding along the hinge rod 10. Above the upper attaching bracket and below the lower attaching bracket, the said rod is bent laterally providing thereby an upper pivot arm 11 and a lower pivot arm 12. It is preferable in bending these arms that the same lie in a common plane. The ends of both arms preferably terminate substantially equal distances from the axis of the vertical portion or body of the rod 9, and both are screw threaded so as to be adjustably received in cap like bearing members designated in Figures 1, 2 and 3 by numerals 13 and 14 for the upper and lower arms respectively. Said caps 13 and 14 are provided with sockets therein transverse to the direction of the arm, a pivot bolt 15 extending upwardly through the upper cap 13 into the top 4 of the wardrobe and a stud pivot 16 projecting downwardly from the socket of the lower cap 14 into the floor 5 of the wardrobe. The arrangement is such that the upper pivot bolt 15 and the lower pivot stud 16 are substantially in alignment parallel to the body portion 9 of pivot rod.

In view of the difficulty of getting pivots so far separated as these pivots are, placed in actual alignment, I provide several adjustments which will enable me to obtain perfect alignment of the doors notwithstanding some slight variation in the alignment of the pivot pins. The upper pivot pin or bolt 15 passes through a hub portion 17 of a face plate 18 secured to the top wall 4 of the wardrobe, as by bolts 19. The hub portion 17 provides an upper end which may be engaged by a nut or the like 20 on the pivot bolt securing the bolt in the face plate. The lower pivot stud 16 preferably has its upper end screw threaded into the socket in cap 14 so as to remain fixed with respect to that cap. The lower end of the stud is preferably inserted in a socket 21 having a flange 22 held to the floor as by screws 23. The socket 21 rotatably receives the lower end of pivot stud 16 and I preferably provide steel discs shown as a pair at 24 at the bottom of the socket as a wear member or thrust bearing between the bottom wall of the socket and the lower end of the stud upon which the stud will rest and will determine the elevation of bearing cap 14 above the floor 5 and so that the rotatable support of the stud is taken care of by the steel discs thus enabling the device to be used indefinitely without any appreciable wear due to the rotation under pressure. Obviously, any number of discs 24, within limits, may be inserted as an adjustment of the pivot in a vertical direction. It will be observed that the lower stud rotates within its socket 21, whereas the upper pivot is preferably screw threaded into its socket and held in place by lock nut 20 so that rotation will take place between the cap 13 and bolt 15 at the upper end of the door support. Bolt 15 and cap 13 may obviously be constructed of suitable material so that the constant rotation of the cap on said stud will not cause any appreciable wear.

By virtue of the bolt 15 threaded into socket 17 and secured by lock nut 20, it will be observed that I provide a vertical adjustment to allow for slight variations in the length of hinge rod 9 or height of the ceiling of the wardrobe. Obviously the pivot bolt 15 will not have to be adjusted after installation has been completed as the wardrobe will not change its height nor its rod vary in length due to wear or use. Since the ends of arms 11 and 12 are screw threaded into caps 13 and 14, proper adjustment of the same may be made to advance or retract either the upper or lower end of the vertical pivot rod 9 to take care of any moderate variation from alignment of the upper and lower pivots.

Figure 1:
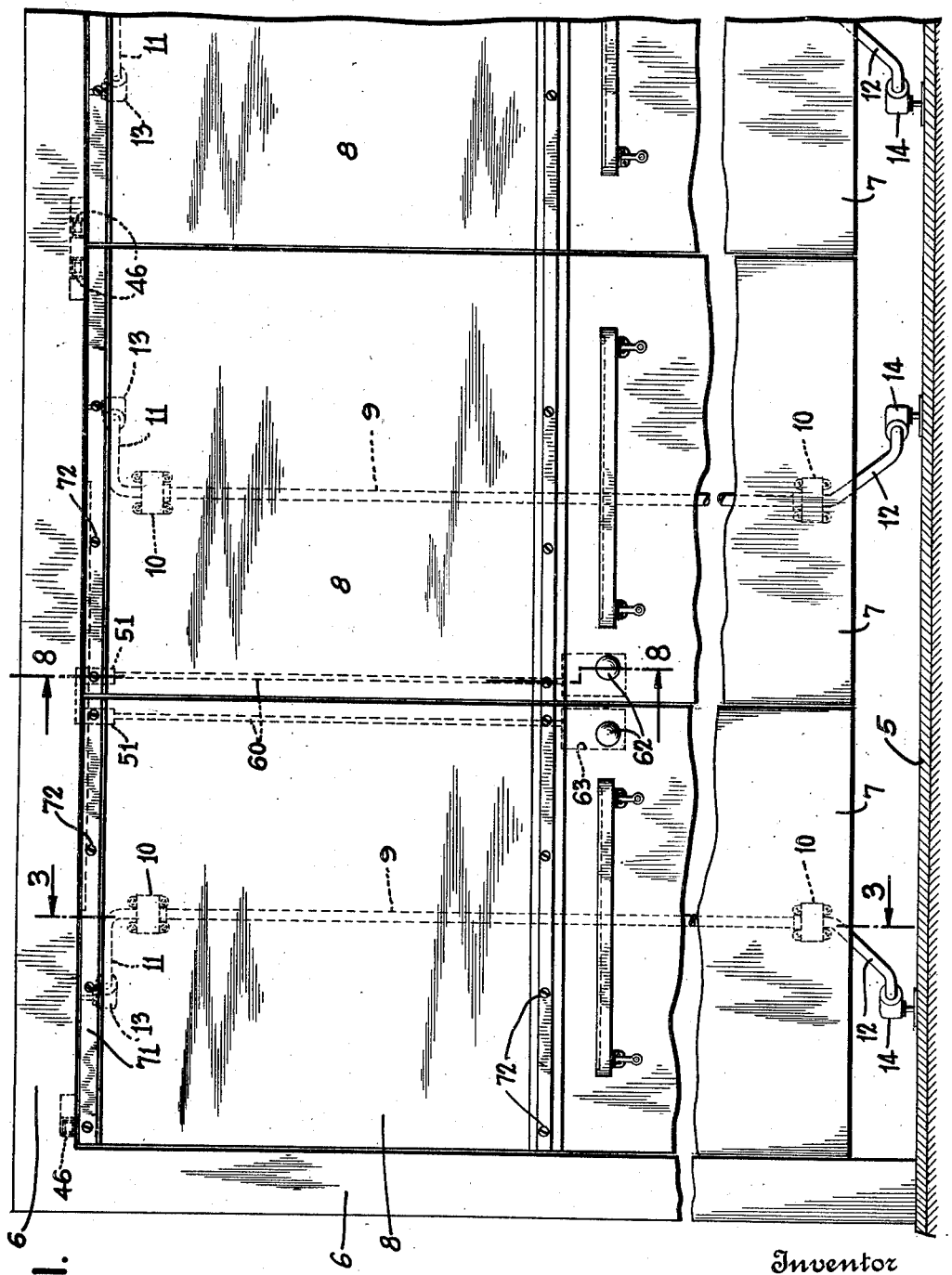
Figure 1 shows, in front elevation a portion of a wardrobe having a plurality of doors hung in accordance with my invention and closing said wardrobe.

While I have shown caps 13, 14 in Figure 1 to 3 as one-piece construction, it is possible to obtain greater ease of attachment and operation by increasing the number of parts if found more desirable. For instance, I have illustrated in Figures 11 and 12 a construction of cap which provides for a universal movement. This type of cap is particularly advantageous in event the pivot pins are not in exact alignment or in parallel lines. A very slight twist from alignment will cause considerable friction and wear on the one-piece construction and a construction providing for universal movement is accordingly desirable to overcome inaccuracy in installation. The construction shown in Figures 11 and 12 provides a door 7 with attaching brackets 10 for a rod 9 the opposite ends of which provide upper and lower pivot arms 11 and 12 as heretofore described. I also provide a hub portion 17 on a face plate 18 at the top wall 4 of the wardrobe for securing a pivot bolt 15 thereat, and also provide a socket 21 at the floor of the wardrobe for receiving a pivot stud 16, as heretofore described. The upper and lower arms 11 and 12 are adjustably received in cap like bearing members on the said pivot bolt and stud, said bearing members being designated in Figures 11 and 12 by numerals 25, 25. Preferably each door supporting arm 11 and 12 is threaded into a bearing member 25 so that adjustment of the arm with respect to the pivot may be obtained and so that slight rotation between the arm and the bearing member may be obtained in case the upper and lower pivots 29 are not in alignment. In this instance the said caps or bearing members 25 are each shown as made up of a plurality of parts so as to obtain a universal movement, and briefly those parts are indicated as a forked member or clevis 26 the forks or arms 28 of which overlie opposite sides of a pivot member 29. A clevis pin 30 passes through the two forked arms and through the pivot member 29 so as to hinge the two together. The direction of passage of the clevis pin 30 through the pivot member 29 is transverse to and offset from the direction of passage of the bolt 15 or stud 16 therethrough. As a consequence, the pivot member and clevis may be rotated together upon the axis of the said bolt and stud. At the same time or independently the clevis may be swung about the clevis pin in a plane defined by the axis of the bolt or stud and the axis of the clevis. The clevis pin is preferably arranged to be in a horizontal position when the bolt and stud are in vertical positions, thereby affording a vertical freedom of movement about a horizontal axis for the hinge or clevis. The clevis is formed to longitudinally receive the end of the door supporting arm 11 or 12, the same being shown as providing a screw threaded engagement for this purpose. The universal movement between the parts is completed by a permissible rotation of the arm and clevis at this threaded engagement between the parts. The clevis provides a very ready means for adjusting the relationship between the arm and cap of which the clevis is a part so as to obtain a very precise alignment of the door when closed. As the doors are swung open the universal movement within the parts forming the cap will take care of irregularities of installation and enable the door to open easily with minimum wear on the parts.

If so desired, a construction may be incorporated to enable me to more readily adjust the position of the door with respect to the pivots either at time of installation or at subsequent times in case the floor should settle or parts otherwise get out of alignment. I have illustrated this construction in Figures 13 and 14 wherein the door 7 is mounted on rod 9 by means of brackets 10 as heretofore described and upper and lower pivot bolts or studs 15 and 16 are provided in the ceiling and floor with appropriate mounting as heretofore described. The supporting rod 9 provides transverse upper and lower arms 11 and 12 directed toward the point of pivoting, and said arms are mounted with respect to the pivot bolt and stud 15, 16 by caps 31, 31. These caps in this instance are shown as providing each with a pivot member 32 having a hub properly recessed to receive the bolt or stud and having a shank 33 extending laterally from the said hub so that the axis of said shank and the axis of bolt or stud will be at right angles. Furthermore, the shank 33 is adapted to be aligned with the end of the arm 11 or 12, and both the shank and the end of the arm are screw threaded as shown. Preferably the threading on one of these parts is reversed to the threading of the other part, that is, one is a right hand thread and the other is a left hand thread. Said shank 33 and the end of arm 11 or 12 are then introduced into opposite ends of a turn buckle 34 screw threaded at its ends at opposite directions and properly threaded to receive the shank and rod end. Lock nuts 34' are provided for securing the turn buckles positively to the shanks 33. Obviously by rotating the turn buckle in one direction the shank and rod end will be drawn together whereas rotating the turn buckle in the opposite direction will separate those parts. By this means I obtain a very readily operated adjustment, and one which can be manipulated after installation should the necessity arise.

Brackets 10 attaching the rod to the door are adjustable transversely of the rod, that is, in a direction from side to side of the door. This adjustment is obtained by an assembly next to be described. The attaching bracket 10 (Figures 3, 4, 5 and 6) for mounting the pivot rod on the door 7 provides a base plate 35 fastened to the door in any suitable manner as by screws 36. At the front of this base plate are arranged an outer plate 37 and an inner plate 38 each having a middle portion curved away from the other plate, as at 39, 40 respectively for encircling the pivot rod 9. Marginal portions of the said outer and inner plates 37, 38 are arranged flatwise together and have registering slots 41 therethrough which receive screws 42 threaded into the base plate 35. The slots preferably extend in a direction transverse to the rod 9, thus enabling the pair of plates 37, 38 to be slid laterally when the screws 42 are loosened. In order to obtain a minute adjustment of this lateral movement, I preferably turn down the edges of the outer plate 37, as at 43, opposite the ends of the slots 41, which edges lie in a vertical direction on the door. This turned down edge also engages and confines ends of the inner plate 38 so that both plates will be moved together. At a middle part of each turned down edge 43 I rotatably insert an adjusting screw 44 the head of which bears against the turned down portion and the inner end of which is threaded into a cleat 45 positioned between the base plate 25 and the inner plate 38. For convenience in manufacture and assembly I have shown this cleat 45 carried by the clamping screws 42 which accordingly prevent the cleat from moving laterally with respect to the base plate 35. The adjusting screw 44 is rotatable in the turned down edge of the outer plate, as a result of which the turned down edge of the plate will be moved toward the cleat by screwing up on the adjusting screw 44. An adjusting screw and cleat is provided at opposite ends of the plate 37, that is, on opposite sides of the pivot rod so that lateral adjustment is secured by unscrewing one of the adjusting screws and screwing up on the other. Obviously the several adjustments above described will enable me to obtain a three dimensional adjustment of the door, as a result of which all of the doors may be brought flush with each other when closed with the greatest amount of accuracy and precision.

It is to be observed that I have provided, by the structure above described, a door which is mounted upon a hinge member extending all the way from top to bottom of the door, securing thereby not only a rigidity independent of the rigidity of the door, but obtain also means for accurately and permanently adjusting the pivotal support so the doors will come to an exact registering flush closure. The actual pivot of the door is offset with respect thereto by virtue of arms 11 and 12, so that the door revolves about the pivot as distinguished from rotating with respect thereto. For the use to which I prefer to make of the particular doors being described, it is preferable to attach the hinging member or rod 9 substantially midway between the side edges of the door, but obviously this may be varied as found desirable or necessary. At the upper corner of the door which swings into the wardrobe, I provide a track 46 which preferably is substantially perpendicular to the plane of the door when closed and lies substantially in the plane of the door when the door is open. This track 46 is mounted by appropriate cleats 47 to the ceiling of the wardrobe or other compartment. The support is preferably adjustable so that in hanging and adjusting the doors, the track may be placed in exact position for serving its purpose. It is to be noted that said cleats 47 are provided with slots 48 in a direction transverse to the track, and the cleats are supported by screws or other devices 49 passing through said slots. The adjustment transverse to the tracks therefore obtains an adjustment transverse to the door when open or longitudinally of the upper edge of the door when the door is closed. In making the hinge adjustment to bring the doors into exact registration toward each other proper adjustment is made of the tracks 46, as will be understood by inspection of the relationships shown in Figure 2. The door has a roller 50 positioned at its upper edge riding within the track and engaging the side walls thereof for guiding the inner end of the door as the door is swung.

At the opposite top edge of the door from the roller 50 I provide a catch by means of which the door may be locked in its closed position. It is to be observed that these catches are at the corners of the doors which meet as the pair of doors are brought into closed position, and therefore the adjacent catches will maintain the edges in exact flush registration. Preferably the catches include mechanism for manually releasing the same and for enabling the catches to automatically snap into locked position. By reference to Figures 7 and 8 it will be observed that the catch comprises a latch 51 slidable vertically in a housing 52 which is imbedded in the door 7. This latch provides an interior slot or pocket 53 also vertically arranged and receiving a transversely positioned screw 54 projecting thereinto from the housing and limiting the permissible longitudinal movement of the catch both into extended and retracted positions. The outer tongue of this latch has a curved surface 55 toward the inside face of the door so as the door is swung closed this surface 55 will engage a sloping surface of a keeper 56 and therefore depress the latch until it comes to the inner end of the keeper at which point it is permitted to snap behind the shoulder of the keeper. The opposite side of the tongue of the latch from the curved surface 55 is tapered, as at 57. This tapered surface engaging behind the shoulder of the keeper and wedging thereinto so that the door will be held very securely against rattling or altering its position when the surface of the door is being used as a blackboard.

The latch 51 has another longitudinal slot or opening 58 toward its lower part and at the bottom of this opening is a head 59 to a squared rod 60 which passes slidably through a squared notch 58' in the lower end of said latch at the bottom of said opening 58. Between the said head 59 and the upper end of the opening 58 is a compression spring 61 which tends to always slide the latch to its uppermost position. However, the latch may be depressed, as by sliding inwardly on keeper 56, independent of movement of said rod 60, the spring 61 compressing under such circumstances and the latch sliding upon rod 60. However, the latch may be retracted by sliding the rod downwardly as head 59 thereon overlies the portion of the latch surrounding the rod and therefore can be utilized to exert a direct pull downwardly upon the latch.

For operating the latch manually, the rod 60 above described is operatively connected to a door knob 62. Within the housing 63 adjacent to the door knob, is provided a slidable member 64 which in reality is a continuation of the rod 60. It is to be observed, that rod 60 may be screwed into the upper end of said slidable member 64 by virtue of screw threads 65 and threaded socket 66 in the upper end of said member thereby enabling the parts to be properly adjusted. The lower end of slidable member 64 is pivoted as at 67 to an arm 68 the other end of which is carried by the door knob. Upon turning the door knob the arm 68 is swung downwardly and draws the slidable member 64 with it. Said slidable member 64 is held normally in its upper position by a tension spring 69 carried at its upper end by the housing and hooking into a lateral extension 70 on the slidable member at the lower end of the spring. It is to be observed that the parts closely associated with the door knob, as well as rod 60 extending up to the latch are only operated upon when turning the door knob as the latch will have no effect in operating these parts when it is independently depressed.

As heretofore stated, the disclosure herein is in connection with doors used for wardrobes in schoolrooms, and it therefore is desirable to utilize the doors as blackboards. Blackboards of the present day are usually of slate or other breakable material and it is therefore a feature of the present invention to not only provide doors which operate easily, smoothly and without vibration, but to properly support the blackboard so as to not be readily broken should the door be slammed with unusual force. It will be observed that the top and bottom of the blackboard 8 have molding 71 overlying the marginal portions thereof, these moldings allow for adjustment of the blackboards with respect to the doors when being installed. Appropriate screws or other holding means 72 pass through the moldings and blackboards into the doors both at the top and bottom of the blackboard. Preferably I provide a recess 73, as shown in Figure 3, immediately behind the blackboard and around the shank of screw 72 for an appropriate depth, and mount a compression spring 74 in the said recess 73 around the screw, the opposite ends of said spring engaging against the inner surface of the blackboard and against the inner end of the recess, thereby holding the blackboard slightly spaced from the surface of the door. This arrangement will operate to absorb shock and prevent breakage of the slate and at the same time hold the slate rigid when being used as a blackboard.

Obviously detail changes and modifications may be made in the construction and use of my improved wardrobe, and I do not wish to be understood as limiting myself to the exact construction shown or described, except as set forth in the following claims when construed in the light of the prior art.

What is claimed is:—

1. In combination with a door having a hinge member, attaching means for said hinge member comprising a base plate, and a pair of plates having registering slots, and screws extending through said slots into the base plate adapted to be loosened for adjusting the pair of plates with respect to the base plate and tightened for holding such adjustment.

2. In combination with a door having a hinge member, attaching means for said hinge member comprising a base plate, and a pair of plates having registering slots, and screws extending through said slots into the base plate adapted to be loosened for adjusting the pair of plates with respect to the base plate and tightened for holding such adjustment and screw means for obtaining the adjusting movement of the said pair of plates with respect to the base.

3. In combination with a door having a hinge member, attaching means for said hinge member comprising a base plate, a pair of plates one of which has turned down edges overlying the ends of the other plate so as to prevent longitudinal movement of the plates with respect to each other, and means for adjustably securing said pair of plates to the base plate.

4. In combination with a door having a hinge member, attaching means for said hinge member comprising a base plate, a pair of plates one of which has turned down edges overlying the ends of the other plate so as to prevent longitudinal movement of the plates with respect to each other, and a screw extending through said turned down end into a part fixed with respect to the base plate for obtaining adjusting movement between said pair of plates and the base plate.

5. A device of the class described comprising mechanism for pivotally mounting a door to open and close, comprising a bar adapted to be secured to a door between the vertical edges thereof, and extending longitudinally of said door, laterally extending arms at each end of said bar, pivot means located at fixed points outside of the plane of the door, means for securing the arms to said pivots, upper and lower attaching brackets for securing said bar to the door, a collar on the bar under the upper bracket to support the weight of the door and a collar on the bar above the lower bracket to prevent the door from being moved upwardly with respect to the bar, in combination with independently operable means for adjusting the position of the door and bar with respect to said pivot means in three directions.

6. In combination with a door, a vertical hinge rod secured to the door, a door supporting arm extending from each end of the rod; a socket and pivot means for each door supporting arm including, a socket and a pivot; and a horizontally disposed hinge securing at least one of the door supporting arms to the socket and pivot means.

7. In combination with a door, a vertical hinge rod secured to the door, a door supporting arm extending from each end of the rod; a socket and pivot means for each door supporting arm including, a socket and a pivot; and means securing at least one of the door supporting arms to the socket and pivot means including, a horizontally disposed hinge and means permitting relative rotation of the arm and the socket and pivot means.

8. In combination with a door, a vertical hinge rod secured to the door, a pivot for the bottom of said hinge rod, a socket member for receiving said pivot, a pivot for the top of said hinge rod, a socket member for receiving said pivot, door supporting arms extending from the ends of said rod to the pivots, and universal joints between each arm and pivot, and having one end adjustably secured to the arm and the other end adjustably secured to said pivot.

9. In combination with a door, a pair of hinge arms pivotally connected to the door on a line between the vertical edges thereof, a pivot for each arm disposed remote from the plane of the door, a socket member for receiving each pivot, means for guiding the opening and closing movement of the door, and a universal joint for adjustably securing each arm to its respective pivot.

EDWARD H. ELLISON.